United States Patent
Seol

(10) Patent No.: US 11,670,825 B2
(45) Date of Patent: Jun. 6, 2023

(54) BATTERY PACK

(71) Applicant: SAMSUNG SDI CO., LTD., Yongin-si (KR)

(72) Inventor: Jihwan Seol, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 190 days.

(21) Appl. No.: 16/911,646

(22) Filed: Jun. 25, 2020

(65) Prior Publication Data
US 2021/0028431 A1    Jan. 28, 2021

(30) Foreign Application Priority Data

Jul. 25, 2019  (KR) ......................... 10-2019-0090495

(51) Int. Cl.
*H01M 50/529*    (2021.01)
*H01M 10/42*    (2006.01)
*H01M 50/20*    (2021.01)

(52) U.S. Cl.
CPC ....... *H01M 50/529* (2021.01); *H01M 10/425* (2013.01); *H01M 50/20* (2021.01)

(58) Field of Classification Search
CPC ... H01M 10/425; H01M 50/20; H01M 50/529
See application file for complete search history.

(56) References Cited

U.S. PATENT DOCUMENTS

| | | |
|---|---|---|
| 8,373,535 B2 | 2/2013 | Lavenuta |
| 8,822,051 B2 | 9/2014 | Yoo |
| 9,444,086 B2 | 9/2016 | Shimizu et al. |
| 9,466,863 B2 | 10/2016 | Hong et al. |
| 9,515,356 B2 | 12/2016 | Zeng et al. |
| 9,893,333 B2 | 2/2018 | Hoshi et al. |
| 9,917,336 B2 | 3/2018 | Nakano et al. |
| 2001/0046624 A1* | 11/2001 | Goto ................... H01M 50/291 180/68.5 |
| 2009/0022206 A1 | 1/2009 | Shibuya et al. |
| 2012/0121939 A1* | 5/2012 | Yoo ..................... H01M 10/42 429/7 |

(Continued)

FOREIGN PATENT DOCUMENTS

| | | |
|---|---|---|
| CN | 101527375 A | 9/2009 |
| CN | 103378326 A | 10/2013 |

(Continued)

OTHER PUBLICATIONS

Japanese Office action dated Aug. 16, 2021.

(Continued)

*Primary Examiner* — Karie O'Neill Apicella
(74) *Attorney, Agent, or Firm* — Lee IP Law, P.C.

(57) ABSTRACT

A battery pack including a cell block including a group of battery cells electrically connected to each other; and a detector on a lateral surface of the cell block, the detector including an insulative body, a voltage detection lead, and a temperature detection lead, wherein the insulative body faces an outer peripheral surface of a first battery cell, the outer peripheral surface being exposed at the lateral surface of the cell block, and the voltage detection lead and the temperature detection lead are at least partially surrounded and fixed by the insulative body.

20 Claims, 7 Drawing Sheets

(56) References Cited

U.S. PATENT DOCUMENTS

| | | | |
|---|---|---|---|
| 2012/0169289 A1 | 7/2012 | Kim et al. | |
| 2015/0118530 A1 | 4/2015 | Lee | |
| 2016/0172651 A1 | 6/2016 | Ichikawa et al. | |
| 2016/0181579 A1* | 6/2016 | Geshi | H01M 50/20 429/61 |
| 2017/0187011 A1 | 6/2017 | Cho | |
| 2017/0271634 A1 | 9/2017 | Hasegawa et al. | |
| 2019/0372082 A1 | 12/2019 | Yun et al. | |

FOREIGN PATENT DOCUMENTS

| | | |
|---|---|---|
| CN | 104904037 A | 9/2015 |
| CN | 105745781 A | 7/2016 |
| JP | 2001-325931 A | 11/2001 |
| JP | 2002-25633 A | 1/2002 |
| JP | 2003-178732 A | 6/2003 |
| JP | 2005-197192 A | 7/2005 |
| JP | 2006-332010 A | 12/2006 |
| JP | 2007-294281 A | 11/2007 |
| JP | 2012-038468 A | 2/2012 |
| JP | 2012-104833 A | 5/2012 |
| JP | 2013-105571 A | 5/2013 |
| JP | 2014-132585 A | 7/2014 |
| JP | 5593591 B2 | 8/2014 |
| JP | 2016-58189 A | 4/2016 |
| JP | 2017-501538 A | 1/2017 |
| JP | 2017-069098 A | 4/2017 |
| JP | 2017-073326 A | 4/2017 |
| JP | 2017-096687 A | 6/2017 |
| JP | 6227569 B2 | 10/2017 |
| JP | 2020-524371 A | 8/2020 |
| KR | 10-0854413 B1 | 8/2008 |
| KR | 10-2012-0053458 A | 5/2012 |
| KR | 10-2012-0078373 A | 7/2012 |
| KR | 10-2015-0048501 A | 5/2015 |
| KR | 10-1537457 B1 | 7/2015 |
| KR | 10-1642341 B1 | 7/2016 |
| KR | 10-1836408 B1 | 3/2018 |
| KR | 10-2018-0088197 A | 8/2018 |
| WO | WO 2012/173233 A1 | 12/2012 |
| WO | WO 2015/099476 A1 | 7/2015 |
| WO | WO 2016-031863 A1 | 3/2016 |

OTHER PUBLICATIONS

Japanese Patent Publication dated Feb. 4, 2022.
Chinese Office action dated Jul. 19, 2022.
Chinese Notice of Allowance dated Jan. 20, 2023.

\* cited by examiner

BATTERY PACK

CROSS-REFERENCE TO RELATED APPLICATION

Korean Patent Application No. 10-2019-0090495, filed on Jul. 25, 2019, in the Korean Intellectual Property Office, and entitled: "Battery Pack," is incorporated by reference herein in its entirety.

BACKGROUND

1. Field

Embodiments relate to a battery pack.

2. Description of Related Art

In general, secondary batteries refer to batteries that can be charged and recharged unlike non-rechargeable primary batteries. Secondary batteries may be used as energy sources of devices such as mobile devices, electric vehicles, hybrid vehicles, electric bicycles, or uninterruptible power supplies. Secondary batteries may be individually used or secondary battery modules (packs), each including a plurality of secondary batteries connected as one unit, may be used according to the types of external devices using secondary batteries.

Unlike small mobile devices such as cellular phones each operable for a certain period of time using a single battery, devices such as electric vehicles or hybrid vehicles having long operation times and consuming large amounts of electricity may use battery modules (packs) each including a plurality of batteries (battery cells) to handle issues relating to power and capacity, and the output voltages or currents of battery modules may be increased by adjusting the number of batteries included in each battery module.

SUMMARY

The embodiments may be realized by providing a battery pack including a cell block including a group of battery cells electrically connected to each other; and a detector on a lateral surface of the cell block, the detector including an insulative body, a voltage detection lead, and a temperature detection lead, wherein the insulative body faces an outer peripheral surface of a first battery cell, the outer peripheral surface being exposed at the lateral surface of the cell block, and the voltage detection lead and the temperature detection lead are at least partially surrounded and fixed by the insulative body.

The cell block may have a pair of long lateral surfaces and a pair of short lateral surfaces, the pair of long lateral surfaces and pair of short lateral surfaces surrounding and being tangent to outer peripheral surfaces of the battery cells, and the detector may be on a long lateral surface of the pair of long lateral surfaces of the cell block.

The battery pack may further include tab plates arranged along the pair of long lateral surfaces of the cell block, the tab plates electrically connecting the group of battery cells to each other.

Battery cells, which are arranged along the long lateral surface of the cell block with the outer peripheral surfaces of the battery cells being adjacent to each other, may be in a zigzag pattern such that the battery cells are alternately at relatively inward positions and relatively outward positions with respect to the long lateral surface of the cell block, the first battery cell may be at a relatively inward position with respect to the long lateral surface of the cell block, and the detector may face the first battery cell.

The voltage detection lead and the temperature detection lead may extend vertically side by side in a lengthwise direction of the first battery cell.

The voltage detection lead may include a detection end on an end of the voltage detection lead and exposed at a lower end of the insulative body to form a voltage detection position at a lower portion of the cell block; and a connection end on another end of the voltage detection lead and exposed at an upper end of the insulative body for connection with a circuit board on the cell block.

The detection end of the voltage detection lead may make conductive contact with one of the tab plates that is electrically connected to the first battery cell.

The detection end of the voltage detection lead may be closer to a battery cell that is adjacent to the first battery cell than it is to the first battery cell.

The detector may include a thermistor chip on the insulative body, the temperature detection lead may extend from the thermistor chip between the outer peripheral surface of the first battery cell and the insulative body, and the temperature detection lead may include a connection end exposed at an upper end of the insulative body for connection with a circuit board on the cell block.

The detector may include a thermistor chip on the insulative body such that the thermistor chip is between the outer peripheral surface of the first battery cell and the insulative body, and the insulative body may include a pressing portion configured to locally press the thermistor chip toward the outer peripheral surface of the first battery cell.

The pressing portion may be insertable in a direction toward the outer peripheral surface of the first battery cell from an outer surface of the insulative body, which is opposite the outer peripheral surface of the first battery cell.

The battery pack may further include a circuit board on the cell block; and a connector configured to connect connection ends of the voltage detection lead and the temperature detection lead to the circuit board.

The battery pack may further include a cooling plate between the cell block and the circuit board, wherein the connector is connected to the circuit board and bypasses around the cooling plate.

The insulative body may include a facing surface having a concave shape complementary to the outer peripheral surface of the first battery cell.

The embodiments may be realized by providing a battery pack including a cell block including a group of battery cells that are electrically connected to each other, the cell block having a pair of long lateral surfaces and a pair of short lateral surfaces, the pair of long lateral surfaces and pair of short lateral surfaces surrounding and being tangent to outer peripheral surfaces of the battery cells; and a detector configured to detect state information from three battery cells of the group of battery cells of which the outer peripheral surfaces are adjacent to each other along a long lateral surface of the pair of long lateral surfaces of the cell block, the detector including an insulative body, voltage detection leads, and a temperature detection lead, the insulative body fixing positions of voltage detection leads and a temperature detection lead.

The three battery cells may include a center cell at a center position along the long lateral surface of the cell block, and side cells on respective sides of the center cell, and the detector may be configured to detect temperature information from the outer peripheral surface of the center cell and voltage information from the side cells.

The insulative body may include a center member facing the center cell; and a pair of side hollow members on respective sides of the center member and facing the side cells on respective sides of the center cell.

The center member may include a main body having a plate shape, facing the outer peripheral surface of the center cell, and spaced apart from the outer peripheral surface of the center cell; and an alignment rib protruding from the main body toward the center cell and forming a center facing surface, the center facing surface having a concave shape complementary to the outer peripheral surface of the center cell.

The main body may cover an outer side of the temperature detection lead, the outer side being opposite the outer peripheral surface of the center cell.

The pair of side hollow members may include protrusions protruding toward valley regions between the center cell and the side cells; and side facing surfaces extending from the protrusions and having a concave shape complementary to the outer peripheral surfaces of the side cells.

The pair of side hollow members may include hollow spaces accommodating the voltage detection leads.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
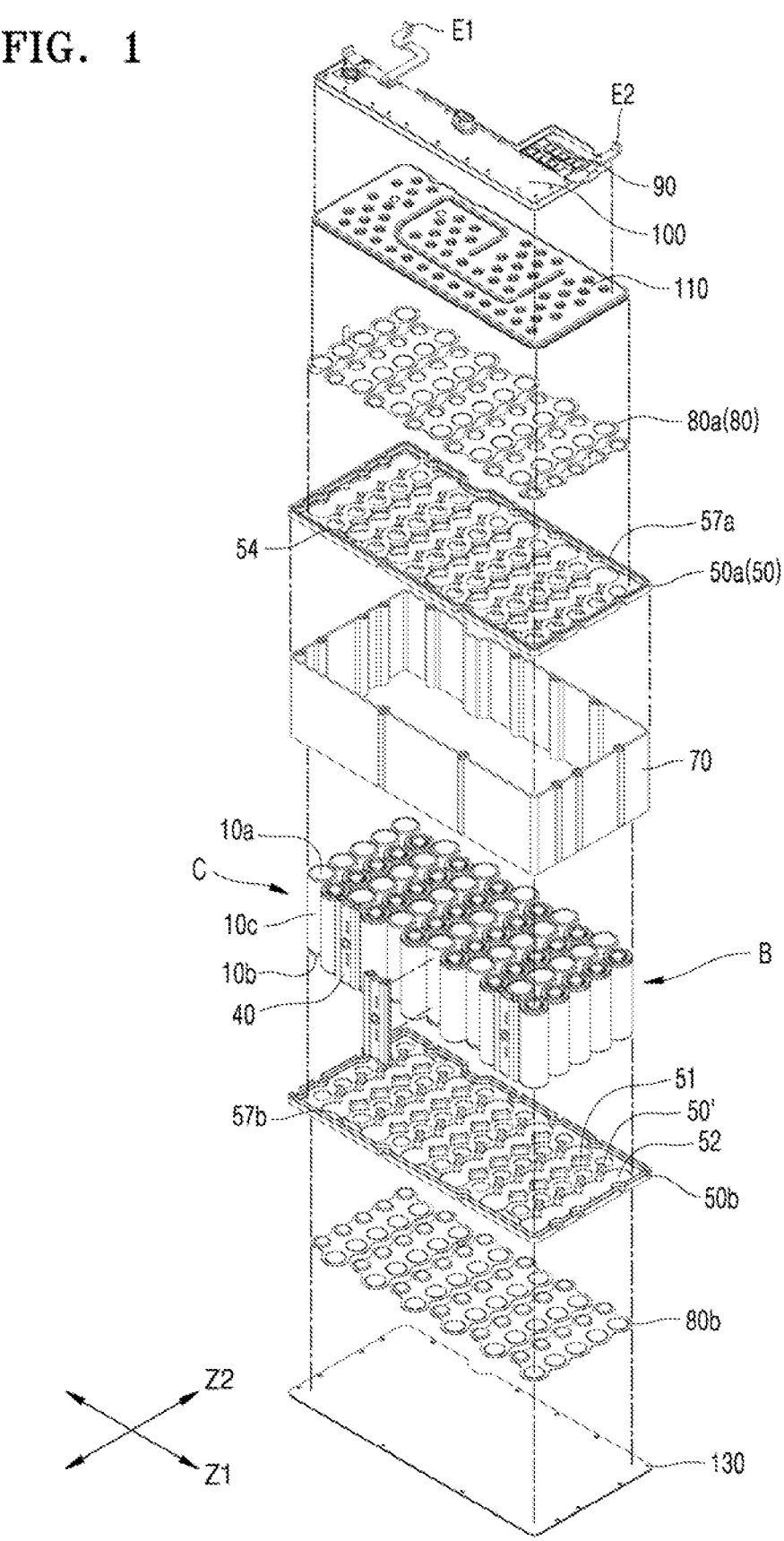
FIG. 1 is an exploded perspective view of a battery pack according to an embodiment.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the terms "or" and "and/or" include any and all combinations of one or more of the associated listed items. Throughout the disclosure, the expression "at least one of a, b or c" indicates only a, only b, only c, both a and b, both a and c, both b and c, all of a, b, and c, or variations thereof.

A battery pack will now be described according to embodiments with reference to the accompanying drawings.

Figure 2:
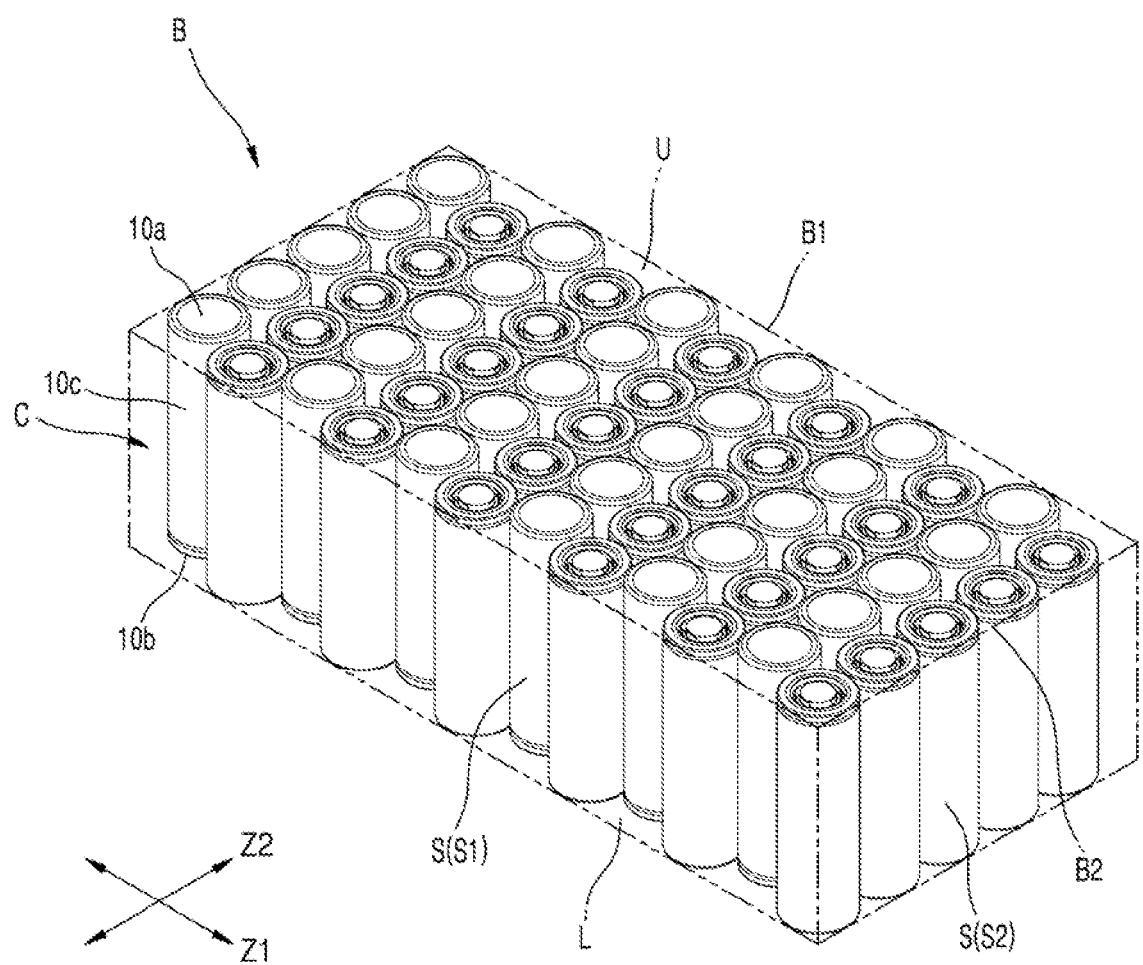
FIG. 2 is a perspective view of a cell block shown in FIG. 1.
Figure 3:
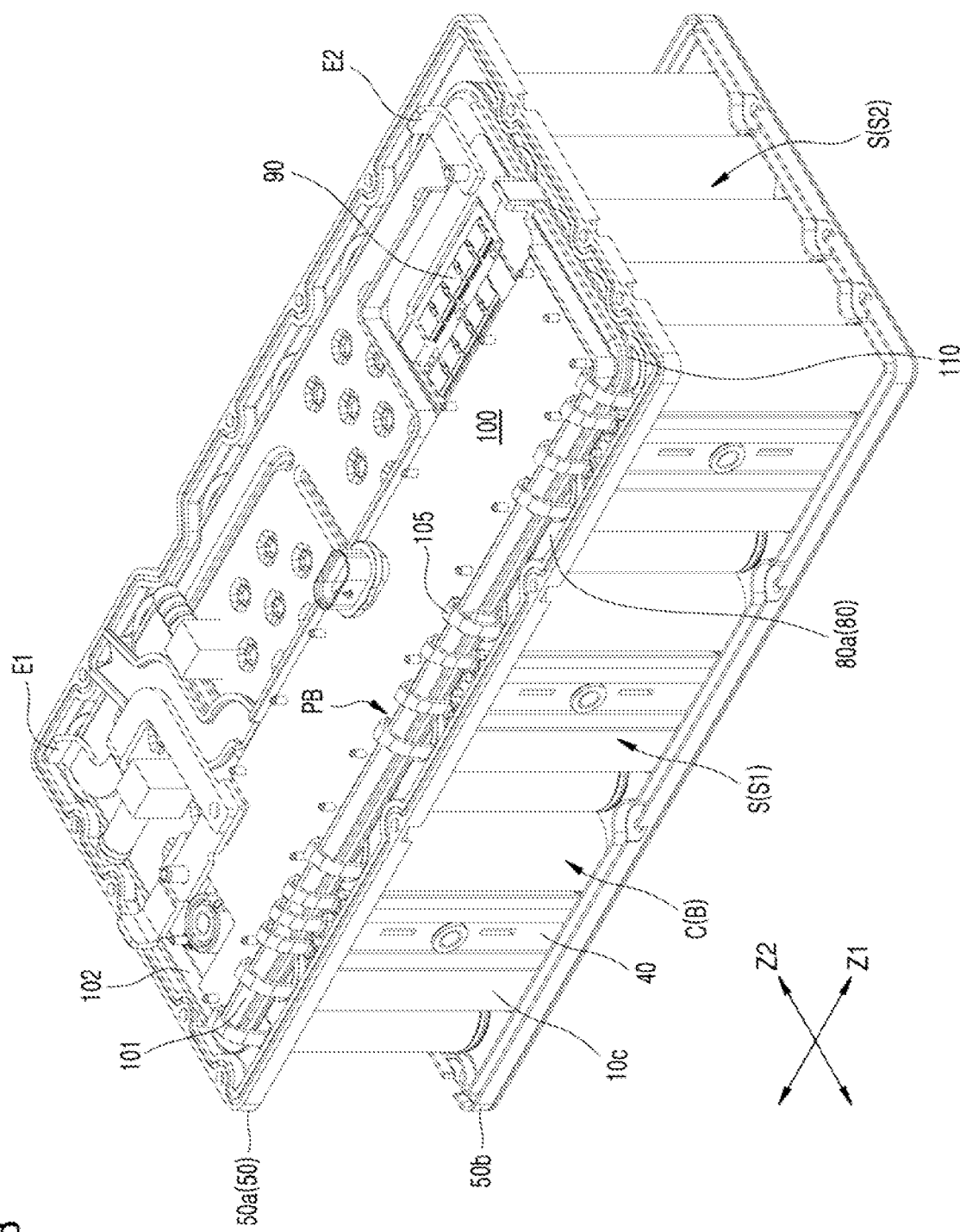
FIG. 3 is a perspective view of the battery pack shown in FIG. 1.

FIG. 1 is an exploded perspective view of a battery pack according to an embodiment. FIG. 2 is a perspective view of a cell block shown in FIG. 1. FIG. 3 is a perspective view of the battery pack shown in FIG. 1.

Referring to FIG. 1, according to an embodiment, the battery pack may include, e.g., a plurality of battery cells C; a holder 50 structurally binding the battery cells C together; tab plates 80 electrically connecting the battery cells C to each other; and a cooling plate 110 and a circuit board 100 sequentially arranged above or on the tab plates 80.

The battery cells C may be cylindrical battery cells C each including: an upper end 10*a* and a lower end 10*b* that form both ends of the battery cell C in the lengthwise direction of the battery cell C; and an outer peripheral surface 10*c* having a cylindrical shape and formed between the upper end 10*a* and the lower end 10*b*. The upper end 10*a* and the lower end 10*b* of each battery cell C may form electrodes having different polarities. Throughout the present specification, the upper end 10*a* and the lower end 10*b* of each battery cell C may respectively refer to an end at an upper position and an end at a lower position in a vertical direction parallel to the lengthwise direction of the battery cell C, and may not be distinguished from each other according to polarities thereof such as a positive polarity and a negative polarity. For example, the upper ends 10*a* of the battery cells C adjacent to each other may have the same polarity or different polarities according to the vertical orientations of the battery cells C. Similarly, the lower ends 10*b* of the battery cells C adjacent to each other may have the same polarity or different polarities according to the vertical orientations of the battery cells C.

Referring to FIG. 2, the battery cells C may be electrically connected to each other and may form a cell block B. The cell block B may be a polyhedral region that includes a group of battery cells C electrically connected to each other, surrounds the outside of the group of battery cells C, and makes contact with the group of battery cells C. For example, the cell block B may be defined as a polyhedral region including an upper surface U facing the upper ends 10*a* of the group of battery cells C, a lower surface L facing the lower ends 10*b* of the group of battery cells C, and lateral surfaces S facing the outer peripheral surfaces 10*c* of the group of battery cells C. In this case, the upper surface U, the lower surface L, and the lateral surfaces S of the cell block B may be defined as flat surfaces that surround the outside of the group of battery cells C and make contact with the group of battery cells C. The cell block B may be a virtual, e.g., imaginary, block with specific defined virtual surfaces that facilitate explanation and definition of elements relative to the group of battery cells C.

For example, the cell block B may be defined as a polyhedral region that includes a flat surface making contact with the upper ends 10*a* of the group of battery cells C as the upper surface U, a flat surface making contact with the lower ends 10*b* of the group of battery cells C as the lower surface L, and flat surfaces making contact with the outer peripheral surfaces 10*c* of the group of battery cells C as the lateral surfaces S. For example, even though the outer peripheral surfaces 10*c* of the battery cells C may be formed in a cylindrical shape, e.g., to have curved or wavy surfaces, the lateral surfaces S of the cell block B may be flat surfaces surrounding and being tangent to the outer peripheral surfaces 10*c* of the battery cells C (e.g., rather than being waved or wavy surfaces connecting and tracing the outer peripheral surfaces 10*c* of the battery cells C adjacent to each other). In an implementation, the cell block B may be formed in a hexahedral shape, and the lateral surfaces S of the cell block B may include a pair of long lateral surfaces S1 and a pair of short lateral surfaces S2 that surround and are tangent to the outer peripheral surfaces 10c of the group of battery cells C. As described below, a detector 40 may be on a long lateral surface S1 of the cell block B.

Each of the upper surface U and the lower surface L of the cell block B may be a quadrangular surface that has a pair of long sides B1 and a pair of short sides B2 as neighboring sides. In an implementation, long sides B1 of the cell block B may refer to relatively long sides along which the upper surface U (or the lower surface L) and the long lateral surfaces S1 of the cell block B having a hexahedral shape are in contact with each other. In an implementation, short sides B2 of the cell block B may refer to relatively short sides along which the upper surface U (or the lower surface L) and the short lateral surfaces S2 of the cell block B having a hexahedral shape are in contact with each other. As described above, the lateral surfaces S of the cell block B are not waved surfaces connecting the outer peripheral surfaces 10c of the group of battery cells C to each other, but are flat surfaces surrounding and being tangent to waved surfaces connecting the outer peripheral surfaces 10c of the group of battery cells C to each other. In an implementation, the long sides B1 and the short sides B2, along which the lateral surfaces S and the upper surface U (or the lower surface L) are in contact with each other, may not be waved lines connecting the outer peripheral surfaces 10c of the group of battery cells C, but may be straight lines or flat surfaces surrounding and being tangent to the waved lines.

Referring to FIG. 1, the battery pack may include the holder 50 to structurally bind the battery cells C together, e.g., the group of battery cells C forming the cell block B. The holder 50 may include: cell receivers 51 and 52 that have a circular shape and match the outer peripheral surfaces 10c of the battery cells C to surround the outer peripheral surfaces 10c of the battery cells C; and arrangements of the cell receivers 51 and 52 corresponding to the arrangement of the battery cells C. In this case, the battery cells C may be assembled at given positions surrounded by the cell receivers 51 and 52. The battery cells C may be placed at staggered positions such that the battery cells C may be inserted between each other, and thus, the battery cells C may be densely arranged. According to the dense arrangement of the battery cells C, the cell receivers 51 and 52 surrounding the battery cells C may also be arranged in a dense pattern like the battery cells C. In an implementation, the cell receivers 51 and 52 may include different types of cell receivers 51 and 52 according to the vertical orientation of the battery cells C, e.g., cell receivers 52 of a hole type, and cell receivers 51 surrounded by ribs.

In addition to the cell receivers 51 and 52 into which the battery cells C are inserted for being assembled in place, the holder 50 may also include a detector receiver 54 into which the detector 40 is inserted for being assembled in place. For example, the detector receiver 54 may be in the form of a through-hole penetrating the holder 50, and an upper end of the detector 40 may be exposed through the detector receiver 54 such that the upper end of the detector 40 may be connected to the circuit board 100 through the connectors 105 (refer to FIG. 3). The connectors 105 may form electrical connection between the detector 40 and the circuit board 100.

The holder 50 may include terminal holes 50' to expose at least portions of the upper ends 10a and the lower ends 10b of the battery cells C and facilitate electrical connection through the upper ends 10a and the lower ends 10b. For example, the terminal holes 50' may be through-holes penetrating the cell receivers 51 and 52 of the holder 50. The tab plates 80 may be arranged on the holder 50 and may be electrically connected to the upper ends 10a and the lower ends 10b of the battery cells C that are exposed through the terminal holes 50' of the holder 50.

The holder 50 may include an upper holder 50a and a lower holder 50b that respectively surround the upper ends 10a and the lower ends 10b of the battery cells C, and the outer peripheral surfaces 10c of the battery cells C may be exposed between the upper holder 50a and the lower holder 50b in the lengthwise direction of the battery cells C. As described below, the detector 40 may be mounted on the exposed outer peripheral surfaces 10c of the battery cells C and may detect temperature information from the outer peripheral surfaces 10c of the battery cells C.

A case frame 70 may be assembled between the upper holder 50a and the lower holder 50b. The case frame 70 may extend across the outer peripheral surfaces 10c of the battery cells C that are exposed between the upper holder 50a and the lower holder 50b, and may cover the outer peripheral surfaces 10c of the battery cells C and also the detector 40 mounted on the outer peripheral surfaces 10c of the battery cells C. In this case, the case frame 70 may have a function of protecting the detector 40 from the external environment and bringing the detector 40 into tight contact with the outer peripheral surfaces 10c of the battery cells C to help prevent the detector 40 from being separated from the outer peripheral surfaces 10c of the battery cells C. In an implementation, the case frame 70 may be fitted between the coupling ribs 57a and 57b formed along the edges of the upper holder 50a and the lower holder 50b.

The group of battery cells C forming the cell block B may be electrically connected to each other through the tab plates 80. The tab plates 80 may electrically connect the battery cells C to each other by connecting the upper ends 10a and the lower ends 10b of the battery cells C to each other. In this case, the tab plates 80 may electrically connect the battery cells C in parallel to each other by connecting identical polarities together and/or may electrically connect the battery cells C in series to each other by connecting opposite polarities together.

The group of battery cells C electrically connected to each other by the tab plates 80 may be arranged with the same vertical orientation in a parallel connection direction Z2 such that identical polarities may be connected together through the tab plates 80 for parallel connection, and may be arranged with vertically reversed orientations in a series connection direction Z1 such that opposite polarities may be connected together through the tab plates 80 for series connection. Here, the parallel connection direction Z2 and the series connection direction Z1 may respectively refer to a direction Z2 parallel to the short sides B2 of the cell block B and a directions Z1 parallel to the long sides B1 of the cell block B. In an implementation, the arrangement of the battery cells C in the direction Z2 parallel to the short sides B2 of the cell block B may form a parallel connection in which identical polarities are connected to each other through the tab plates 80, and the arrangement of the battery cells C in the direction Z1 parallel to the long sides B1 of the cell block B may form a series connection in which different polarities are connected to each other through the tab plates 80. In this case, the arrangement of the battery cells C forming a series connection is set to be longer than the arrangement of the battery cells C forming a parallel connection such that the series connection direction Z1 may be parallel to the long sides B1, which are relatively long, and the parallel connection direction Z2 may be parallel to the short sides B2, which are relatively short.

In an implementation, the parallel connection direction Z2 may be the length direction Z2 of the tab plates 80 in which each tab plate 80 extends, and the series connection direction Z1 may be an arrangement direction Z1 in which the tab plates 80 are arranged. The tab plates 80 may be configured such that the battery cells C may be connected in parallel to each other in the length direction Z2 of the tab plates 80 and may be connected in series to each other in the arrangement direction Z1 in which the tab plates 80 are arranged.

The tab plates 80 may include upper tab plates 80a connected to the upper ends 10a of the battery cells C, and lower tab plates 80b connected to the lower ends 10b of the battery cells C. The battery cells C arranged in the parallel connection direction Z2 parallel to the short sides B2 of cell block B may be connected in parallel to each other through the upper tab plates 80a and the lower tab plates 80b, and the battery cells C arranged in the series connection direction Z1 parallel to the long sides B1 of the cell block B may be connected in series to each other through the upper tab plates 80a and the lower tab plates 80b. In this case, the upper tab plates 80a and the lower tab plates 80b may be staggered in an alternating pattern in the series connection direction Z1 such that the battery cells C arranged in the series connection direction Z1 may be connected in series to each other through the upper tab plates 80a and the lower tab plates 80b. As described below, according to an embodiment, the detector 40 may include a plurality of detectors 40 arranged in the direction Z1 parallel to the long sides B1 (or the long lateral surfaces S1), e.g., the series connection direction Z1, and each of the detectors 40 may make conductive contact with different tab plates 80 arranged in the series connection direction Z1 to detect voltage information from the battery cells C through the different tab plates 80. In addition, an insulator 130 may be arranged below the lower tab plates 80b.

The circuit board 100 may be arranged on the tab plates 80 (e.g., the upper tab plate 80a). The circuit board 100 may collect state information from the battery cells C and control charge and discharge operations of the battery cells C based on the collected state information. In an implementation, the circuit board 100 may detect malfunctions of the battery cells C such as overheating, overcharging, or overdischarging, take protective measures to prevent accidents such as explosions or fires, and stop charge and discharge operations of the battery cells C using a switch 90 on a charge-discharge path.

Referring to FIG. 3, the detector 40 may be connected to the circuit board 100. In an implementation, connectors 105 may be between the detector 40 and the circuit board 100 for electrical connection therebetween. In an implementation, a plurality of detectors 40 may be arranged along a long lateral surface S1 of the cell block B, and a plurality of connectors 105 connected to the detectors 40 may be arranged along a side of the circuit board 100. In this case, when the cell block B and the circuit board 100 are arranged in shapes corresponding to each other, the connectors 105 arranged along the long lateral surface S1 of the cell block B may be arranged along a long side 101 of the circuit board 100, and thus, a plurality of connection positions PB may be formed along the long side 101 of the circuit board 100. The detector 40 may be connected to the circuit board 100 through the connectors 105, and voltage information and temperature information collected by the detector 40 may be transmitted to the circuit board 100 via the connectors 105.

The cooling plate 110 may be between the circuit board 100 and the tab plates 80. In an implementation, the cooling plate 110 may be between the tab plates 80 and the circuit board 100, and state information about the battery cells C may not be transmitted directly from the tab plates 80 to the circuit board 100. In an implementation, state information about the battery cells C may be transmitted from the detector 40 on a lateral surface S of the cell block B to the circuit board 100 through the connectors 105 that are connected from the detector 40 to the circuit board 100 while bypassing (e.g., going around) the cooling plate 110. In an implementation, voltage information about the battery cells C may be transmitted through connectors 105 that are, while bypassing the cooling plate 110, connected to the circuit board 100 from the upper tab plates 80a connected to the upper ends 10a of the battery cells C while bypassing the cooling plate 110. This will be described in greater detail below.

Referring to FIG. 1, the cooling plate 110 may be between the circuit board 100 and the tab plates 80 and may cool the circuit board 100 and the battery cells C connected to the tab plates 80. In an implementation, the cooling plate 110 may cool circuit elements on the circuit board 100 and the switch 90 connected to the circuit board 100, and may cool the battery cells C through the tab plates 80. In an implementation, the cooling plate 110 may cool the switch 90, which is connected to the circuit board 100 and on the charge-discharge path to connect and disconnect the charge and discharge path. In addition, the switch 90 may be between the circuit board 100 and an external terminal E2. A pair of external terminals E1 and E2 may be formed, and the external terminals E1 and E2 may be respectively connected to the circuit board 100 and the switch 90.

Figure 4:
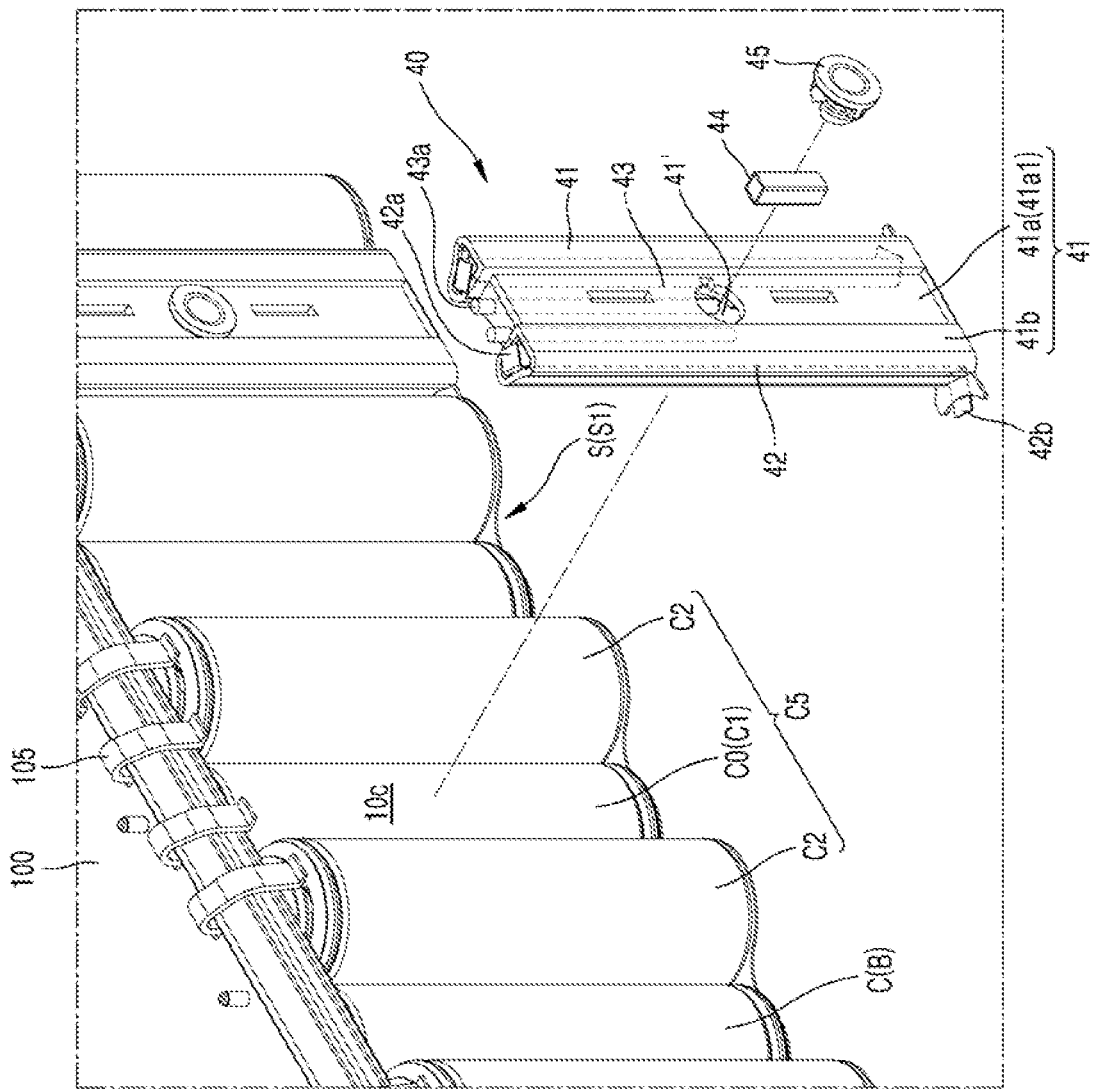
FIGS. 4 and 5 are different perspective views of portions of the battery pack shown in FIG. 3.
Figure 5:
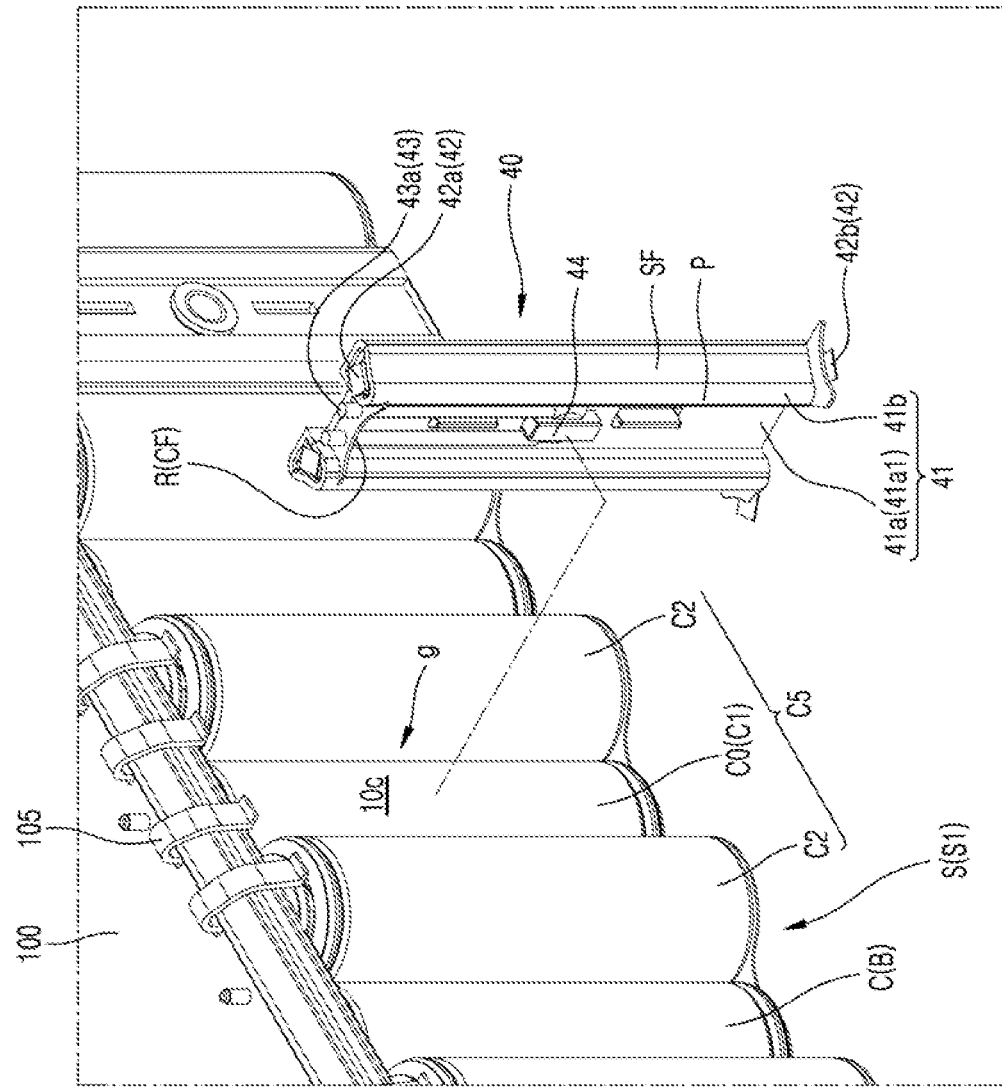
Figure 6:
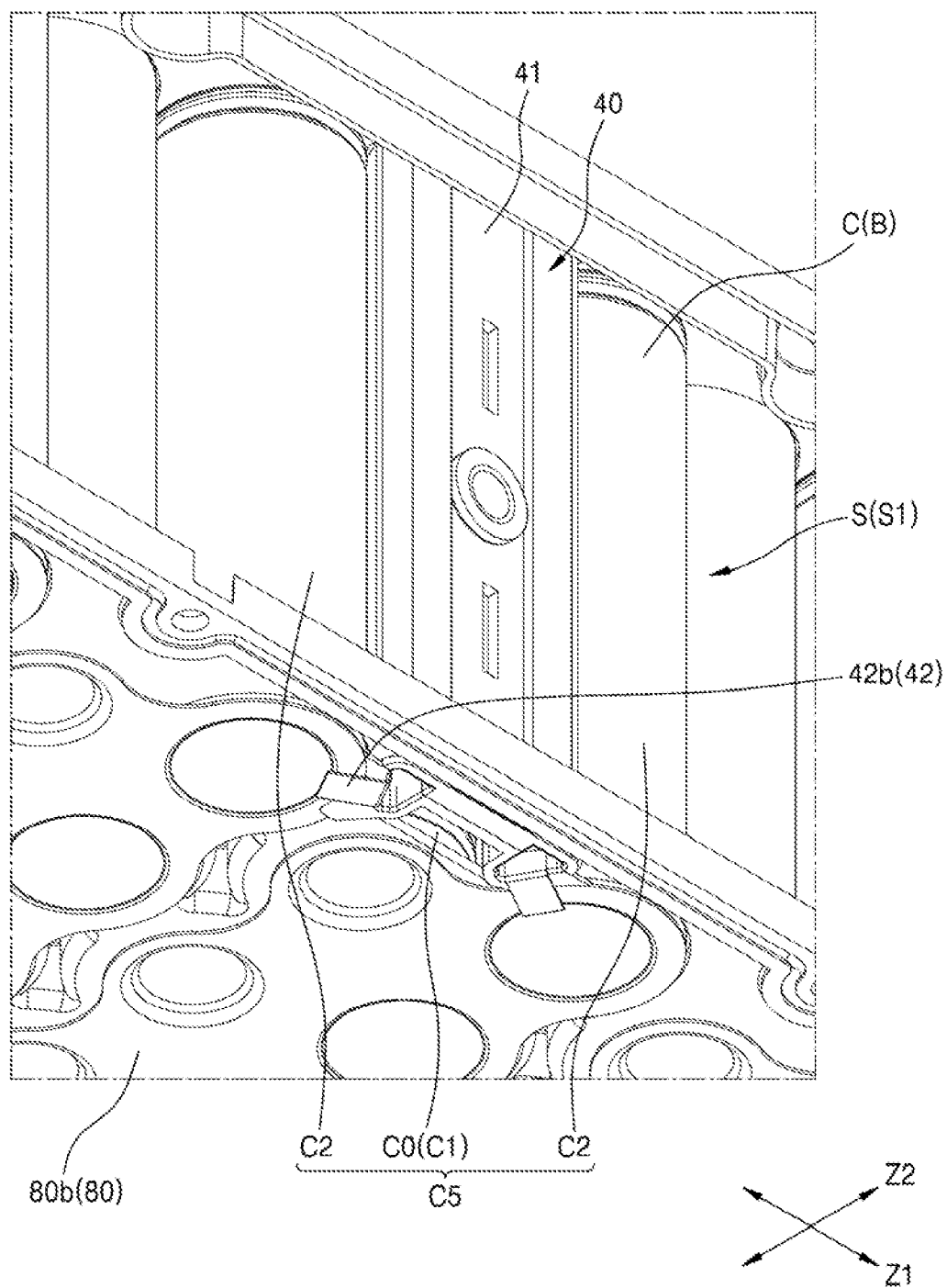
FIGS. 6 and 7 are different perspective views of portions of the battery pack shown in FIG. 3.
Figure 7:
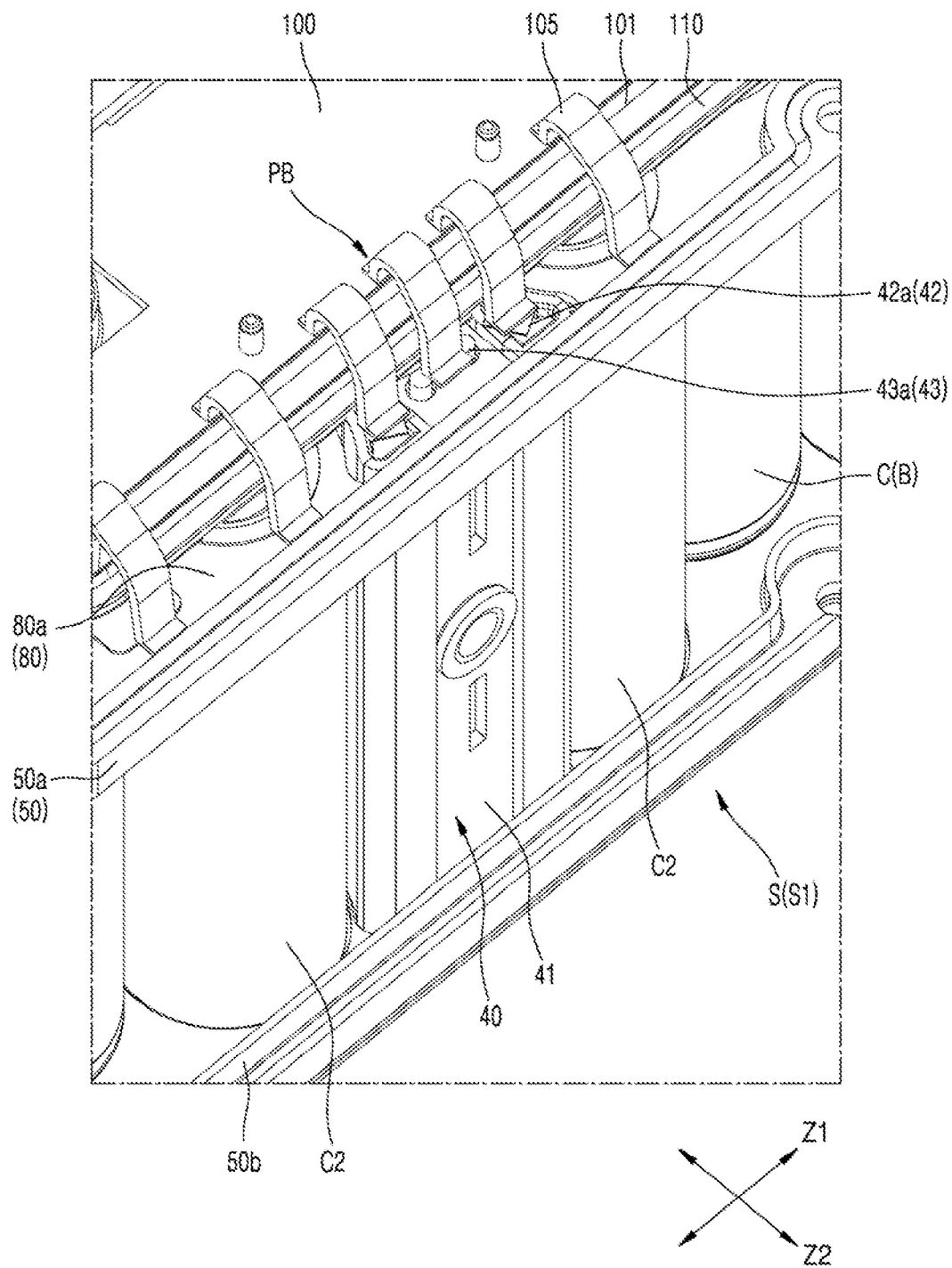

FIGS. 4 and 5 are different perspective views of portions of the battery pack shown in FIG. 3. FIGS. 6 and 7 are different perspective views of portions of the battery pack shown in FIG. 3.

Referring to FIGS. 4 and 5, in an embodiment, the battery pack may include the detector 40 on a lateral surface S of the cell block B. The detector 40 may include: an insulative body 41 facing the outer peripheral surface 10c of a first battery cell C1; and voltage detection leads 42 and temperature detection leads 43, which are fixed by the insulative body 41. In an implementation, the first battery cell C1 may refer to one of the battery cells C of the cell block B from which the detector 40 detects state information, and the first battery cell C1 may include an outer peripheral surface 10c that is exposed at the lateral surface S of the cell block B such that the detector 40 on the lateral surface S of the cell block B may access the first battery cell C1.

The insulative body 41 may include a center member 41a facing the outer peripheral surface 10c of the first battery cell C1, and the center member 41a may bring a thermistor chip 44 into tight contact with the outer peripheral surface 10c of the first battery cell C1 such that temperature information may be detected from the outer peripheral surface 10c of the first battery cell C1 through the thermistor chip 44.

The voltage detection leads 42 and the temperature detection leads 43 may be for detecting voltage information and temperature information from the first battery cell C1 or other battery cells C (corresponding to side cells C2) adjacent to the first battery cell C1, and may be fixed by the insulative body 41. In an implementation, the insulative body 41 may include: side hollow members 41b, which surround the voltage detection leads 42 for fixing the positions of the voltage detection leads 42; and the center member 41a, which surrounds the temperature detection leads 43 for fixing the positions of the temperature detection leads 43. As will be described in greater detail below, the temperature detection leads 43 may penetrate an alignment rib R (refer to FIG. 5) of the center member 41a while being surrounded by the alignment rib R of the center member 41a. The insulative body 41 may insulate and protect the voltage detection leads 42 and the temperature detection leads 43 from the external environment and may securely fix the positions of the voltage detection leads 42 and the temperature detection leads 43 to help reduce or prevent electrical or physical interference between the voltage detection leads 42 and the temperature detection leads 43.

The insulative body 41 may surround at least portions of the voltage detection leads 42 and the temperature detection leads 43. In an implementation, the insulative body 41 may include, e.g., the side hollow members 41b that provide hollow spaces for accommodating the voltage detection leads 42; and the center member 41a that surrounds the outsides of the temperature detection leads 43. In this case, the temperature detection leads 43 may be surrounded by the center member 41a, which is on an outer side, and the first battery cell C1 (the outer peripheral surface 10c of the first battery cell C1), which is on an inner side, and thus, the temperature detection leads 43 may be protected from the external environment. In an implementation, the center member 41a may cover outer sides of the temperature detection leads 43 and may not cover inner sides of the temperature detection leads 43 such that the temperature detection leads 43 may directly face the first battery cell C1, which is on an inner side, and may be used to detect the temperature of the first battery cell C1. As described below, the center member 41a may include a plate-shaped main body 41a1 that covers the outer sides of the temperature detection leads 43.

The insulative body 41 may include an insulative material to insulate and protect the voltage detection leads 42 and the temperature detection leads 43 from the external environment. In an implementation, the insulative body 41 may include a polymer resin material. In an implementation, the insulative body 41 may be formed by molding a resin to surround at least portions of the voltage detection leads 42 and the temperature detection leads 43.

The voltage detection leads 42 and the temperature detection leads 43 may vertically extend in the lengthwise direction of the first battery cell C1 and may transmit voltage information and temperature information. Referring to FIG. 6, the voltage detection leads 42 may measure voltage at a lower portion or end of the cell block B, and for example, the voltage detection leads 42 may make conductive contact with a tab plate 80 electrically connected to the first battery cell C1 or tab plates 80 electrically connected to other battery cells C (corresponding to the side cells C2) adjacent to the first battery cell C1. In an implementation, detection ends 42b of the voltage detection leads 42 may make conductive contact with the tab plates 80 connected to the battery cells C (corresponding to the side cells C2) adjacent to the first battery cell C1, and to this end, the detection ends 42b may be biased toward the battery cells C (corresponding to the side cells C2) adjacent to the first battery cell C1 rather than being biased toward the first battery cell C1. The voltage detection leads 42 may be formed as a pair to detect voltage information from the battery cells C (corresponding to the side cells C2) that are adjacent to both sides of the first battery cell C1, and to this end, the detection ends 42b may be biased toward the battery cells C (corresponding to the side cells C2) adjacent to both sides of the first battery cell C1 rather than being biased toward the first battery cell C1.

For example, the detection ends 42b may be closer to the side cells C2 than they are to the first battery cell C1. In an implementation, the detection ends 42b may extend outwardly from the insulative body 41 toward the side cells C2, rather than extending toward the first battery cell C1. In an implementation, one of the detection ends 42b of the voltage detection leads 42 provided as a pair may be connected to a tab plate 80 connected to one of the battery cells (corresponding to the side cells C2) adjacent to the first battery cell C1, and the other of the detection ends 42b may be connected to a tab plate 80 that connects the other of the battery cells C (corresponding to the side cells C2) adjacent to the first battery cell C1 in series to the first battery cell C1. In this case, the detection ends 42b may be described as making conductive contact with tab plates 80 electrically connected to the first battery cell C1.

Voltage information detected through the tab plates 80 may be transmitted to the circuit board 100 through the voltage detection leads 42. Referring to FIG. 4, the voltage detection leads 42 may include, e.g., the detection ends 42b on ends thereof and for detecting voltage information from the lower portion of the cell block B; and connection ends 42a on the other ends thereof, which are opposite the detection ends 42b, and for connection to the circuit board 100. In this case, the detection ends 42b and the connection ends 42a may be exposed from the insulative body 41 through or at lower ends and upper ends of the insulative body 41 for voltage detection at the lower portion of the cell block B and connection to the circuit board 100 at an upper portion of the cell block B.

The insulative body 41 may bring the thermistor chip 44 into tight contact with the outer peripheral surface 10c of the first battery cell C1, and the thermistor chip 44 may be between the insulative body 41 and the first battery cell C1. In this case, the temperature detection leads 43 extending from thermistor chip 44 may include connection ends 43a, which are exposed at the upper ends of the insulative body 41 and are connected to the circuit board 100. In an implementation, the insulative body 41 may include a pressing portion 45 for locally effectively pressing the thermistor chip 44 toward the first battery cell C1, e.g., the pressing portion 45 may bring the thermistor chip 44 into tight contact with the outer peripheral surface 10c of the first battery cell C1. In an implementation, as the pressing portion 45 is assembled in a direction from an outer surface of the insulative body 41 toward the outer peripheral surface 10c of the first battery cell C1, which is opposite the outer surface of the insulative body 41, the thermistor chip 44 between the pressing portion 45 and the outer peripheral surface 10c of the first battery cell C1 may be naturally brought into tight contact with the outer peripheral surface 10c of the first battery cell C1. In an implementation, an assembly hole 41' may be formed in the outer surface of the insulative body 41 such that the pressing portion 45 is insertable into the assembly hole 41'. The pressing portion 45 may include an insulative material or an elastic material such as rubber. In an implementation, the pressing portion 45 may include a material different from the polymer resin material of the insulative body 41.

Referring to FIG. 7, the connection ends 42a and 43a of the voltage detection leads 42 and the temperature detection leads 43 may be exposed at the upper ends of the insulative body 41 and may be connected to the circuit board 100. In this case, the connectors 105 may be between the circuit board 100 and the connection ends 42a and 43a of the voltage detection leads 42 and the temperature detection leads 43. In an implementation, the cooling plate 110 and the circuit board 100 may be sequentially arranged above the cell block B, and in this case, the connectors 105 may bypass (e.g., go around an outer edge of) the cooling plate 110 and may then be connected to the circuit board 100.

Hereinafter, other aspects of the detector 40 will be described according to embodiments. Referring to FIGS. 4 and 5, the detector 40 may be for detecting state information from the battery cells C and may be arranged on the long lateral surface S1 of the cell block B. The detector 40 may detect state information from different battery cells C adjacent to each other along the long lateral surface S1 of the cell block B.

When battery cells C, which are in conductive or thermal contact with the detector 40 for detecting voltage or temperature information from the battery cells C, are referred to as target cells C5, the target cells C5 may include three battery cells C adjacent to each other along the long lateral surface S1 of the cell block B according to an embodiment. Throughout the present specification, among the three target cells C5 adjacent to each other along the long lateral surface S1 of the cell block B, a target cell C5 at a center position along the long lateral surface S1 of the cell block B is referred to as a center cell C0, and target cells C5 at both sides of the center cell C0 are referred to as side cells C2. The first battery cell C1 described above may correspond to a target cell C5 from which state information is detected, e.g., the center cell C0 of the target cells C5.

The detector 40 may be arranged to face the target cells C5 and may include, e.g., the center member 41a facing the center cell C0; and the side hollow members 41b on both lateral edges of the center member 41a and facing the side cells C2.

In an implementation, the center member 41a may straightly face the center cell C0 and may include a center facing surface CF that faces the center cell C0 (refer to FIG. 5). The center member 41a may press the thermistor chip 44 against the outer peripheral surface 10c of the center cell C0 at a position spaced apart from the outer peripheral surface 10c of the center cell C0, and may be spaced apart from the center cell C0 such that the thermistor chip 44 may be between the center member 41a and the center cell C0. In an implementation, the center member 41a may be at a position straightly facing the outer peripheral surface 10c of the center cell C0, and the center member 41a may push the thermistor chip 44 against the center of the outer peripheral surface 10c of the center cell C0.

In an implementation, the center member 41a may include, e.g., the plate-shaped main body 41a1 at a position facing the center cell C0 and spaced apart from the center cell C0; and the alignment rib R that protrudes from the main body 41a1 toward the center cell C0 and forms the center facing surface CF having a concave shape that is complementary to the outer peripheral surface 10c of the center cell C0 to guide the center member 41a to an assembly position with respect to the center cell C0. Throughout the present specification, when the center member 41a has the center facing surface CF, which faces the center cell C0, the center facing surface CF may include, e.g., an inner surface of the main body 41a1, which is in an upright position to face the center cell C0; and an inner surface of the alignment rib R, which faces the center cell C0. In an implementation, the center facing surface CF may not necessarily need to have a complementary concave shape matching the outer peripheral surface 10c of the center cell C0, and even when the main body 41a1 of the center member 41a, which is arranged in an upright position to face the center cell C0, has a flat surface, the main body 41a1 may form the center facing surface CF that faces the center cell C0. However, throughout the present specification, the center facing surface CF may mainly refer to the facing surface of the alignment rib R, which faces the center cell C0 and formed in a concave shape complementary to the center cell C0.

The main body 41a1 of the center member 41a may have a flat plate shape. The main body 41a1 of the center member 41a may be spaced apart from the outer peripheral surface 10c of the center cell C0 and may be outside from the center cell C0, which is at an inward position relative to the lateral surface S of the cell block B. In an implementation, the main body 41a1 of the center member 41a may have a flat plate shape, the main body 41a1 of the center member 41a may form a substantially flat surface together with the outer peripheral surfaces 10c of the side cells C2, which protrude outwardly relative to the lateral surface S of the cell block B, and thus, the lateral surface S of the cell block B, to which the detector 40 is coupled, may be substantially flat.

The alignment rib R (refer to FIG. 5) of the center member 41a may protrude toward the outer peripheral surface 10c of the center cell C0 from the main body 41a1 having a flat plate shape, and may have the center facing surface CF having a concave shape complementary to the outer peripheral surface 10c of the center cell C0, such that the alignment rib R may extend along the outer peripheral surface 10c of the center cell C0. In an implementation, when the detector 40 is coupled to the lateral surface S of the cell block B, the alignment rib R may stably maintain the position of the detector 40 while making tight contact with the outer peripheral surface 10c of the center cell C0.

The center member 41a may cover outer sides of the temperature detection leads 43 and the thermistor chip 44 that are connected to each other, e.g., the center member 41a may cover outer sides which are opposite the first battery cell C1. In an implementation, the temperature detection leads 43 and the thermistor chip 44 may be surrounded by the center member 41a located outside and the center cell C0 located inside (the outer peripheral surface 10c of the center cell C0), and may be insulated and protected from the external environment. The center member 41a may cover the outside of the thermistor chip 44 and may expose the thermistor chip 44 to the first battery cell C1 located inside such that the thermistor chip 44 may detect temperature information from the center cell C0. In an implementation, the center member 41a may include the main body 41a1 having a plate shape that covers and extends across the outer sides of the temperature detection leads 43 and the thermistor chip 44 electrically connected to each other. The center member 41a may cover the outer side of the thermistor chip 44 and may press the thermistor chip 44 toward the outer peripheral surface 10c of the first battery cell C1 located inside.

The positions of the temperature detection leads 43 may be fixed by the center member 41a, e.g., the positions of the temperature detection leads 43 may be fixed by the alignment rib R (refer to FIG. 5) of the center member 41a. The temperature detection leads 43 may extend from the thermistor chip 44 between the outer peripheral surface 10c of the center cell C0 and the center member 41a (e.g., the main body 41a1) and penetrate the alignment rib R of the center member 41a, and in this case, the temperature detection leads 43 may be positioned and fixed by the alignment rib R of the center member 41a while being surrounded by the alignment rib R of the center member 41a.

The side hollow members 41b may be at both sides of the center member 41a to face the side cells C2 and may form side facing surfaces SF (refer to FIG. 5), which face the side cells C2. In an implementation, the side hollow members 41b may include: protrusions P that protrude toward valley regions (g) between the center cell C0 and the side cells C2; and surfaces that are bordered by the protrusions P and face the center cell C0 and the side cells C2, wherein the areas of the side hollow members 41b facing the side cells C2 may be greater than the areas of the side hollow members 41b facing the center cell C0. Throughout the present specification, the side facing surfaces SF may refer to surfaces which face the side cells C2 having relatively large areas. In an implementation, the side facing surfaces SF may extend from the protrusions P, which protrude toward the valley regions (g) between the center cell C0 and the side cells C2, and may face the side cells C2.

The side facing surfaces SF of the side hollow members 41b, which face the side cells C2, may be in contact with the side cells C2 and may have a concave shape complementary to the outer peripheral surfaces 10c of the side cells C2. When the detector 40 is coupled to the lateral surface S of the cell block B, the protrusions P of the side hollow members 41b may be inserted into the valley regions (g) between the center cell C0 and the side cells C2, and the side facing surfaces SF of the side hollow members 41b may be brought into contact with the outer peripheral surfaces 10c of the side cells C2, thereby securely fixing the detector 40 to the lateral surface S of the cell block B.

The side hollow members 41b may surround the voltage detection leads 42 and may provide hollow spaces in which the voltage detection leads 42 are accommodated. The voltage detection leads 42 may be surrounded by the side hollow members 41b such that the positions of the voltage detection leads 42 may be fixed in a state in which the voltage detection leads 42 are insulated and protected from the external environment. For example, the side hollow members 41b may surround the voltage detection leads 42 to electrically insulate and protect the voltage detection leads 42 from the external environment and help prevent physical or electrical interference between the voltage detection leads 42 and the temperature detection leads 43. The side hollow members 41b may be formed as a pair on or at both sides of the center member 41a and may respectively surround the voltage detection leads 42.

The center member 41a and the side hollow members 41b of the insulative body 41 may be connected to each other along the lateral surface of the cell block B, e.g., a long lateral surface S1 of the cell block B to form the center facing surface CF (refer to FIG. 5) and the side facing surfaces SF that respectively face the three target cells C5 adjacent to each other along the lateral surface S of the cell block B. In an implementation, the center member 41a and the side hollow members 41b may extend side by side in the lengthwise direction of the target cells C5. In an implementation, the center member 41a and the side hollow members 41b may extend side by side in a vertical direction to face the target cells C5, e.g., the center member 41a and the side hollow members 41b may extend side by side in the lengthwise of the detector 40.

In an implementation, the detector 40 may include the facing surfaces CF and SF (refer to FIG. 5) formed in a shape that is complementary to and matches the three target cells C5 adjacent to each other along the long lateral surface S1 of the cell block B. In this case, the facing surfaces CF and SF of the detector 40 may include the center facing surface CF of the alignment rib R and the side facing surface SF of the side hollow members 41b. The facing surfaces CF and SF of the detector 40 may include three concave surfaces complementary to an embossed pattern formed by the three target cells C5 of which the outer peripheral surfaces 10c are adjacent to each other. In an implementation, the facing surfaces CF and SF of the detector 40 may include curved surfaces that are respectively formed by the center facing surface CF of the alignment rib R at a center position and the side facing surfaces SF of the side hollow members 41b on both sides of the alignment rib R. In this case, the protrusions P of the side hollow members 41b may protrude toward the valley regions (g) between the center cell C0 and the side cells C2 and may connect the center facing surface CF of the alignment rib R and the side facing surfaces SF of the side hollow members 41b to each other.

The shape of the facing surfaces CF and SF (refer to FIG. 5), which face the three target cells C5 adjacent to each other, may form the outer shape of the detector 40, e.g., the profile of the insulative body 41 forming the outer shape of the detector 40. In an implementation, the insulative body 41 may include, e.g., the center facing surface CF of the alignment rib R; the side facing surfaces SF of the side hollow members 41b; and the protrusions between the center facing surface CF and the side facing surfaces SF.

In an implementation, the detector 40 may detect temperature information from the center cell C0 and voltage information from the side cells C2 at both sides of the center cell C0. In an implementation, the center member 41a of the detector 40 may face the outer peripheral surface 10c of the center cell C0 and may bring the thermistor chip 44 into tight contact with the outer peripheral surface 10c of the center cell C0, and the detector 40 may detect temperature information from the center cell C0 through the outer peripheral surface 10c of the center cell C0. The detector 40 may detect temperature information from the center cell C0 and also voltage information from the side cells C2 arranged on both sides of the center cell C0. In an implementation, the detector 40 may include the voltage detection leads 42 for detecting the voltages of the side cells C2, and the voltage detection leads 42 may penetrate the insulating body 41 (e.g., the side hollow members 41b) and may extend in the lengthwise direction of the insulative body 41. In an implementation, the voltage detection leads 42 may include, e.g., the detection ends 42b extending outwardly from the lower ends of the insulative body 41 and making conductive contact with the side cells C2 (e.g., the tab plates 80 connected to the side cells C2); and the connection ends 42a connected to the circuit board 100 through the connectors 105 at the upper ends of the insulative body 41.

The voltage detection leads 42 may be provided as a pair corresponding to the side cells C2 that are paired on both sides of the center cell C0, and the voltage detection leads 42 may be arranged on both sides of the detector 40 such that the voltage detection leads 42 may be adjacent to the side cells C2, which are detection targets. In addition, the detection ends 42b of the voltage detection leads 42 may be biased toward the side cells C2 adjacent to the center cell C0, rather than being directed or extending toward the center cell C0. In an implementation, the detection ends 42b may be provided as a pair corresponding to the voltage detection leads 42 provided as a pair and may be respectively biased toward (e.g., may extend toward) the side cells C2.

In an implementation, the temperature detection leads 43 for transmitting information about the temperature of the center cell C0 may be fixed to a central position of the detector 40, which corresponds to the thermistor chip 44 pressed by the center member 41a, and the pair of voltage detection leads 42 for transmitting information about the voltages of the side cells C2 may be surrounded by the side hollow members 41b and fixed to both lateral edge positions of the detector 40. The detector 40 may be provided by modularizing elements for detecting temperature information and voltage information into one component, it may be easy to assemble the battery pack, and a structure for detecting temperature and voltage information from the battery cells C may be easily implemented by assembling the detector 40 provided as one component.

The detector 40 may be arranged on the long lateral surface S1 of the cell block B to face the three target cells C5 adjacent to each other along the long lateral surface S1 of the cell block B. In an implementation, the detector 40 may be centered on the center cell C0 (which may be located relatively inward with respect to the long lateral surface S1 of the cell block B among the target cells C5 of which the outer peripheral surfaces $10c$ are adjacent to each other, e.g., inwardly in the Z2 direction), and may be placed at a position straightly facing the center cell C0 and aligned with the center cell C0. In an implementation, the detector 40 may not straightly face the side cells C2, which are arranged on both sides of the center cell C0, e.g., which protrude relatively outwardly with respect to the long lateral surface S1 of the cell block B, but the detector 40 may face portions of the side cells C2 in lateral directions.

In an implementation, the target cells C5 of which the outer peripheral surfaces $10c$ are adjacent to each other along the long lateral surface S1 of the cell block B may be arranged in a zigzag pattern alternately at relatively inward and outward positions with respect to the long lateral surface S1 of the cell block B, and the detector 40 may be aligned to face the center cell C0 of the target cells C5 which is arranged at the relatively inward position such that the detector 40 may be in a dead space to save space (e.g., to help reduce an overall size of a battery pack).

The detector 40 may detect temperature information from the center cell C0 and also voltage information from the side cells C2. In this case, voltage information about the center cell C0 may be obtained from the voltage information of the side cells C2 adjacent to the center cell C0, it may not be necessary to additionally detect voltage information from the center cell C0. For example, the three target cells C5 adjacent to each other along the long lateral surface S1 of the cell block B may be arranged in the series connection direction Z1 parallel to the long lateral surface S1 (or the long sides B1) of the cell block B and may be connected in series to each other, and thus, the voltage between the upper end $10a$ and the lower end $10b$ of the center cell C0 may be substantially the same as the voltage between the side cells C2 connected in series to the center cell C0, e.g., the voltage between the lower end $10b$ of the side cell C2 on one side and the upper end $10a$ of the side cell C2 on the other side such that voltage information about the center cell C0 may be obtained from voltage information about the side cells C2.

The detector 40 may detect the voltages of the lower ends $10b$ of the side cells C2, and the voltages of the upper ends $10a$ of the side cells C2 through the tab plates 80 connected to the upper ends $10a$ of the side cells C2. In an implementation, referring to FIG. 7, the voltages of the upper ends $10a$ of the side cells C2 may be transmitted to the circuit board 100 through the connectors 105 that connect the tab plates 80 and the circuit board 100 to each other. The detector 40 extends vertically in the lengthwise direction of the side cells C2, it may be efficient to measure the voltages of the lower ends $10b$ of the side cells C2 by using the detector 40, and it may be effective for obtaining a simple structure to measure the voltages of the upper ends $10a$ of the side cells C2 by using the connectors 105 that connect the upper ends $10a$ of the side cells C2 (e.g., the tab plates 80 connected to the upper ends $10a$ of the side cells C2) to the circuit board 100 rather than using the detector 40.

Referring to FIG. 3, two or more detectors 40 may be arranged along the long lateral surface S1 of the cell block B, and together with connectors 105 connected to the detectors 40, connectors 105 connected to the upper ends $10a$ of the side cells C2 (e.g., the tab plates 80 connected to the upper ends $10a$) may form connection positions PB arranged in a row along the long side 101 of the circuit board 100. In an implementation, bonding wires or bonding ribbons may be used as the connectors 105. In an implementation, the connectors 105 for transmitting temperature and voltage information may be selectively formed on one of a pair of long sides 101 of the circuit board 100. In an implementation, when the circuit board 100 and the cell block B are arranged in shapes corresponding to each other, the connectors 105 may be arranged along a long lateral surface S1 of the cell block B, e.g., the connectors 105 may be arranged selectively along one of the pair of long lateral surfaces S1 of the cell block B. In an implementation, the tab plates 80 corresponding to voltage detection positions may be arranged in the direction Z1 parallel to the long lateral surfaces S1 (or the long sides B1) of the cell block B, and voltage information may be detected from the tab plates 80 through the connectors 105 arranged along a long lateral surface S1 of the cell block B. In addition, reference numeral 102 in FIG. 3 denotes short sides of the circuit board 100.

In an implementation, the detector 40 may detect temperature information and voltage information from three target cells C5 adjacent to each other along the long lateral surface S1 of the cell block B. In an implementation, a detector 40 may detect temperature information and voltage information from one of target cells C5, or may detect temperature information and voltage information from two target cells C5 adjacent to each other along the long lateral surface S1 of the cell block B. In an implementation, the detector 40 may detect temperature information from the center cell C0 arranged at a central position along the long lateral surface S1 of the cell block B and may detect voltage information from the side cells C2 arranged on both sides of the center cell C0. In an implementation, the detector 40 may detect temperature information and voltage information from the center cell C0 arranged at a center position along the long lateral surface S1 of the cell block B, or may detect temperature information and voltage information from the side cells C2 arranged on both sides of the center cell C0.

As described above, according to the one or more of the above embodiments, the detector 40 may be provided by modularizing elements for detecting temperature information and voltage information into one component, it may be easy to assemble the battery pack, and a structure for detecting temperature and voltage information from the battery cells C may be easily implemented by assembling the detector 40 provided as one component.

One or more embodiments may provide a battery pack including a detector that is modularized as one component and is configured to detect temperature and voltage information from battery cells.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
a cell block including a group of cylindrical battery cells electrically connected to each other; and
a detector on a lateral surface of the cell block, the detector including an insulative body, a voltage detection lead, and a temperature detection lead,
wherein:
the insulative body faces a rounded outer peripheral surface of a first cylindrical battery cell such that the insulative body extends lengthwise in parallel with a lengthwise direction of each of the cylindrical battery cells, the rounded outer peripheral surface being exposed at the lateral surface of the cell block,
the voltage detection lead and the temperature detection lead are at least partially surrounded and fixed by the insulative body, and
the insulative body includes a facing surface having a rounded concave shape complementary to the rounded outer peripheral surface of the first cylindrical battery cell.

2. The battery pack as claimed in claim 1, wherein:
the cell block has a pair of long lateral surfaces and a pair of short lateral surfaces, the pair of long lateral surfaces and pair of short lateral surfaces surrounding and being tangent to rounded outer peripheral surfaces of the cylindrical battery cells, and
the detector is on a long lateral surface of the pair of long lateral surfaces of the cell block.

3. The battery pack as claimed in claim 2, further comprising tab plates arranged along the pair of long lateral surfaces of the cell block, the tab plates electrically connecting the group of cylindrical battery cells to each other.

4. The battery pack as claimed in claim 3, wherein:
cylindrical battery cells, which are arranged along the long lateral surface of the cell block with the rounded outer peripheral surfaces of the cylindrical battery cells being adjacent to each other, are in a zigzag pattern such that the cylindrical battery cells are alternately at relatively inward positions and relatively outward positions with respect to the long lateral surface of the cell block,
the first cylindrical battery cell is at a relatively inward position with respect to the long lateral surface of the cell block, and
the detector faces the first cylindrical battery cell.

5. The battery pack as claimed in claim 4, wherein the voltage detection lead and the temperature detection lead extend vertically side by side in Rail the lengthwise direction of the first cylindrical battery cell.

6. The battery pack as claimed in claim 5, wherein the voltage detection lead includes:
a detection end on an end of the voltage detection lead and exposed at a lower end of the insulative body to form a voltage detection position at a lower portion of the cell block; and
a connection end on another end of the voltage detection lead and exposed at an upper end of the insulative body for connection with a circuit board on the cell block.

7. The battery pack as claimed in claim 6, wherein the detection end of the voltage detection lead makes conductive contact with one of the tab plates that is electrically connected to the first cylindrical battery cell.

8. The battery pack as claimed in claim 6, wherein the detection end of the voltage detection lead is closer to a cylindrical battery cell that is adjacent to the first cylindrical battery cell than it is to the first cylindrical battery cell.

9. The battery pack as claimed in claim 1, wherein:
the detector includes a thermistor chip on the insulative body,
the temperature detection lead extends from the thermistor chip between the rounded outer peripheral surface of the first cylindrical battery cell and the insulative body, and
the temperature detection lead includes a connection end exposed at an upper end of the insulative body for connection with a circuit board on the cell block.

10. The battery pack as claimed in claim 1, wherein:
the detector includes a thermistor chip on the insulative body such that the thermistor chip is between the rounded outer peripheral surface of the first cylindrical battery cell and the insulative body, and
the insulative body includes a pressing portion configured to locally press the thermistor chip toward the rounded outer peripheral surface of the first cylindrical battery cell.

11. The battery pack as claimed in claim 10, wherein the pressing portion is insertable in a direction toward the rounded outer peripheral surface of the first cylindrical battery cell from an outer surface of the insulative body, which is opposite the rounded outer peripheral surface of the first cylindrical battery cell.

12. The battery pack as claimed in claim 1, further comprising:
a circuit board on the cell block; and
a connector configured to connect connection ends of the voltage detection lead and the temperature detection lead to the circuit board.

13. The battery pack as claimed in claim 12, further comprising a cooling plate between the cell block and the circuit board,
wherein the connector is connected to the circuit board and bypasses around the cooling plate.

14. A battery pack, comprising:
a cell block including a group of cylindrical battery cells that are electrically connected to each other, the cell block having a pair of long lateral surfaces and a pair of short lateral surfaces, the pair of long lateral surfaces and pair of short lateral surfaces surrounding and being tangent to rounded outer peripheral surfaces of the cylindrical battery cells; and
a detector configured to detect state information from three cylindrical battery cells of the group of cylindrical battery cells of which the rounded outer peripheral surfaces are adjacent to each other along a long lateral surface of the pair of long lateral surfaces of the cell block, the detector including an insulative body, voltage detection leads, and a temperature detection lead, the insulative body fixing positions of voltage detection leads and a temperature detection lead,
wherein:
the insulative body faces a rounded outer peripheral surface of a center cylindrical battery cell such that the insulative body extends lengthwise in parallel with a lengthwise direction of the center cylindrical battery cell, the rounded outer peripheral surface being exposed at the lateral surface of the cell block, and the insulative body includes a center facing surface having a rounded concave shape complementary to the rounded outer peripheral surface of the center cylindrical battery cell.

15. The battery pack as claimed in claim 14, wherein:
the three cylindrical battery cells include the center cylindrical battery cell at a center position along the long lateral surface of the cell block, and side cylindrical battery cells on respective sides of the center cylindrical battery cell, and
the detector is configured to detect temperature information from the rounded outer peripheral surface of the center cylindrical battery cell and voltage information from the side cylindrical battery cells.

16. The battery pack as claimed in claim 15, wherein the insulative body includes:
a center member facing the center cylindrical battery cell; and
a pair of side hollow members on respective sides of the center member and facing the side cylindrical battery cells on respective sides of the center cylindrical battery cell.

17. The battery pack as claimed in claim 16, wherein the center member includes:
a main body having a plate shape, facing the rounded outer peripheral surface of the center cylindrical battery cell, and spaced apart from the rounded outer peripheral surface of the center cylindrical battery cell; and
an alignment rib protruding from the main body toward the center cylindrical battery cell and forming the center facing surface.

18. The battery pack as claimed in claim 17, wherein the main body covers an outer side of the temperature detection lead, the outer side being opposite the rounded outer peripheral surface of the center cylindrical battery cell.

19. The battery pack as claimed in claim 16, wherein the pair of side hollow members includes:
protrusions protruding toward valley regions between the center cylindrical battery cell and the side cylindrical battery cells; and
side facing surfaces extending from the protrusions and having a concave shape complementary to the rounded outer peripheral surfaces of the side cylindrical battery cells.

20. The battery pack as claimed in claim 16, wherein the pair of side hollow members includes hollow spaces accommodating the voltage detection leads.

* * * * *